INVENTOR.
MAHLON F. EASTERLING
ATTORNEYS

Oct. 14, 1969  JAMES E. WEBB  3,472,019
ADMINISTRATOR OF THE NATIONAL AERONAUTICS
AND SPACE ADMINISTRATION
TIME SYNCHRONIZATION SYSTEM UTILIZING MOON
REFLECTED CODED SIGNALS

Filed Dec. 21, 1967  3 Sheets-Sheet 2

INVENTOR.
MAHLON F. EASTERLING
BY
ATTORNEYS

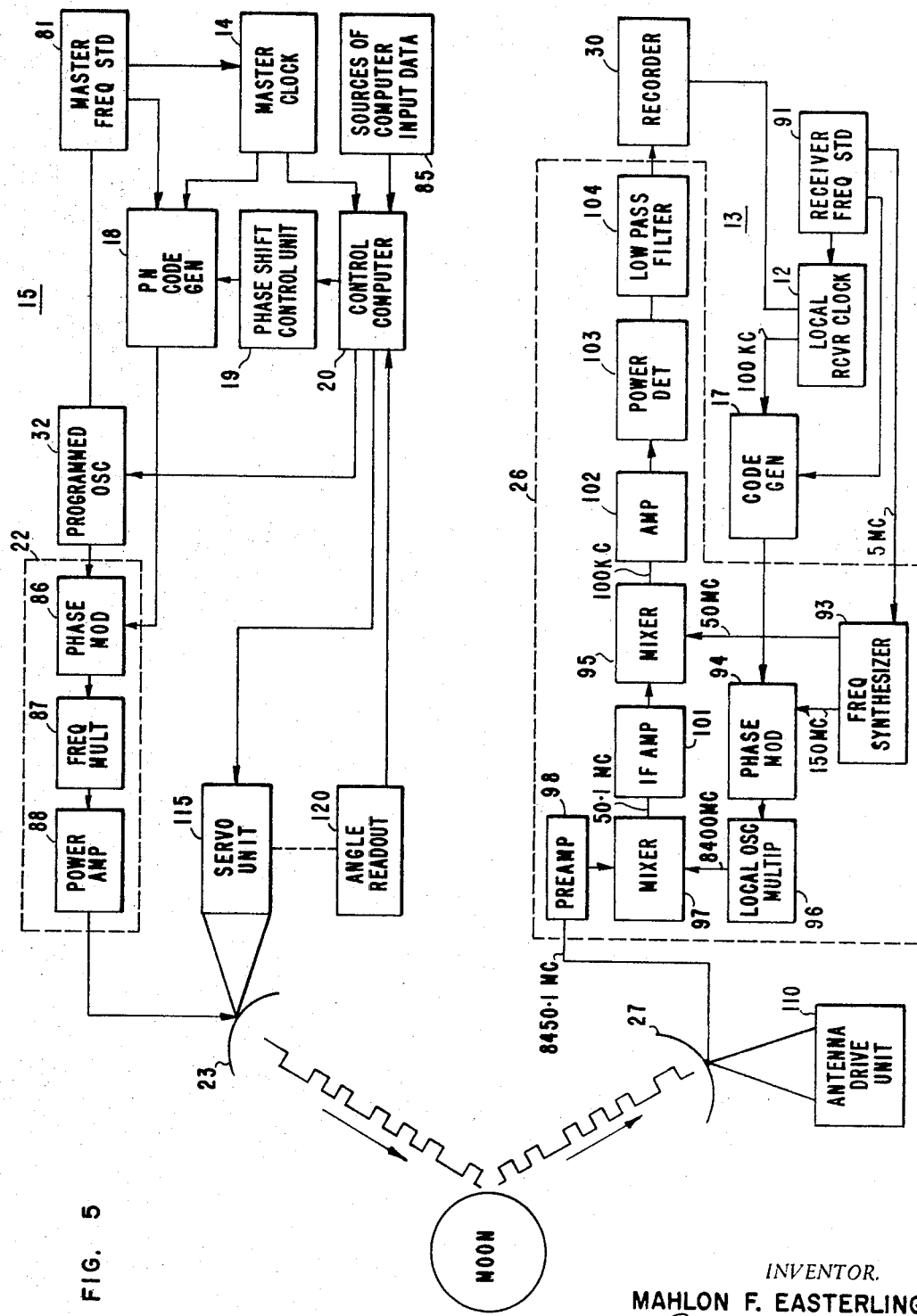

United States Patent Office
3,472,019
Patented Oct. 14, 1969

3,472,019
TIME SYNCHRONIZATION SYSTEM UTILIZING MOON REFLECTED CODED SIGNALS
James E. Webb, Administrator of the National Aeronautics and Space Administration, with respect to an invention of Mahlon F. Easterling, Altadena, Calif. 91001
Filed Dec. 21, 1967, Ser. No. 692,331
Int. Cl. G04c 13/02
U.S. Cl. 58—24
11 Claims

ABSTRACT OF THE DISCLOSURE

A time synchronization system is disclosed, including a transmitter unit which transmits a PN coded signal, or simply a PN code, to the moon for reflection therefrom to a receiver unit on earth located remotely from the transmitter unit. In the latter, a local PN code is generated. The received and local codes are cross-correlated and the cross-correlated power is charted on a strip chart. Master and local clocks in the transmitter and receiver units provide minute and second-defining signals, used to control the phases of the two codes. The phase of the transmitted code is advanced to compensate for signal transmission time, which changes over a selected measurement period, so that the resulting recorded chart can be utilized to determine time error between the two clocks, to within several microseconds.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

The present invention generally relates to a clock synchronization system and, more particularly, to a system capable of synchronizing clocks at remote locations with a master clock.

Description of the prior art

The tracking and controlling of space vehicles, at lunar and planetary distances, is generally accomplished by using several tracking stations, which are strategically located in longitude. Tracking passes from station to station as the earth rotates. To insure continuity of the data which is received by different stations from the vehicle, and for accurate determination of a vehicle's orbit, it is necessary that the local clocks at these stations be accurately synchronized to at least within a few tens of microseconds, preferably less than ten.

The local clock system of each tracking station generally consists of a relatively stable frequency standard, which, together with counting circuits, provides all frequencies, time interval and time-of-day signals, used at the station. Though the frequency standard is quite stable, slight frequency inaccuracies occur during each day. Such inaccuracies may product a drift in time of up to several microseconds per day. This time drift, together with failures, infrequent though they may be, makes it necessary to synchronize the local clocks of the various stations, as well as to daily monitor the synchronization, so that proper clock resetting may be performed when required, to insure that the time of day at each station is the same.

The synchronization of remotely located clocks, to within ten or fewer microseconds, and the ability to monitor the clocks, to insure that they are synchronized within such interval, has not been a simple task. Conventional clock synchronization techniques, such as those based on the use of WWV, do not produce the desired accuracy. A number of systems have been proposed which theoretically would meet the accuracy requirements. However, their use is limited because of cost reasons, the fact that they provide only infrequent calibrations, or because they can operate only when a suitable space vehicle, equipped with uniquie equipment, is available. Thus, a need exists for a new time synchronization system by means of which local clocks, at remotely located stations, may be synchronized to within less than ten microseconds ($\mu$s.).

OBJECTS AND SUMMARY OF THE INVENTION

It is a primary object of the present invention to provide a new time synchronization system which is not limited by the disadvantages of prior art systems.

Another object of this invention is to provide a new time synchronization system for synchronizing clocks at remote stations and for periodic monitoring of the clocks to verify the synchronization accuracy.

A further object is to provide a time synchronization system with an accuracy of better than ten microseconds. The system does not require a transportable time standard or a specially equipped space vehicle.

Still a further object of this invention is the provision of a novel time synchronization system for synchronizing the local clock of a remote station with the master clock of a master station to within a few microseconds accuracy, without resorting to a transportable time standard or specially equipped space vehicle.

These and other objects of the invention are achieved in a system in which radar reflections from the moon are utilized to synchronize clocks at remote locations, with a master clock to within a few microseconds. The system includes a transmitter unit, or simply a transmitter, which is located at a master or transmitting station with a master clock. A radio signal, biphase modulated by a pseudo-random (PN) code, is transmitted by the transmitter unit to the moon. The PN code is controlled in time by the master clock with which the local clock, in each remote station, is to be synchronized.

At each remote station, a receiver unit, or simply a receiver, is located. Its function is to receive the PN coded signals which are reflected by the moon, and compare them by crosscorrelation with a similar PN code which is generated in the receiver unit. The latter is controlled in time by the station's local clock. Peak energy is detected at the receiver only when the two PN codes are in step or correlated. This condition can only exist when the transmitter and the receiver units are in common view of the moon and only when the transmitted code is advanced in time by the signal transmit time via the moon to the receiver unit and the clocks are perfectly synchronized.

The necessary time advance of the transmitted PN code is accomplished by a computer, in the transmitter unit, with time and ephemeris inputs. Since the range to any given receiving station is changing, the code's time advancing must be continuously updated. Also, the carrier frequency used to carry the transmitted code is changed, to remove the Doppler effect so that the carrier signals which are received are of a constant frequency. Since the transmitter computer must adjust the frequency to remove the Doppler at the receiver and must advance the code timing to compensate for signal transit time, signals from the transmitter can be sent to only one receiving station at a time, and, of course, only during periods when the moon is in view at both the transmitting and receiving sites.

In practice, the output of the receiver is recorded on a chart, such as a strip chart along with a timing track, containing 1-minute and 1-second marks. These marks are produced by the local clock in the receiver unit which also times the PN code generated in the receiver unit. In an exemplary embodiment, to be described hereafter in detail the transmitter code is started 30 μs late and advanced by the computer 1 μs per second during each 1-minute transmission time. Thus, if the two clocks are synchronized, on the 30th second of the 1-minute transmission period, the transmitted code arrives at the receiver at the correct time, and at the end of the minute it arrives 30 μs early.

The receiver output, which in essence represents the time of arrival of the transmitted PN code at the receiver, is recorded on the strip chart in the form of a two dimensional graph. A filter, of a selected time constant, is placed ahead of the retcorder effectively to remove the effect of receiver noise. The deviation of a calibrated point on the graph from the 30-second mark, in terms of 1-second markings, represents the number of microseconds by which the receiver clock is out of synchronization with the master clock. Thus, it is only necessary to measure the time of power detection to one second to obtain 1 μs resolution of clock synchronization.

The invention will best be understood from the following description when read in conjunction with the accompanying drawings.

BRIEF DESCRIPTION OF THE DRAWINGS

FIGURE 5 is another block diagram which is similar to the one shown in FIGURE 1, but in greater detail.

DESCRIPTION OF THE PREFERRED EMBODIMENTS

Figure 1:
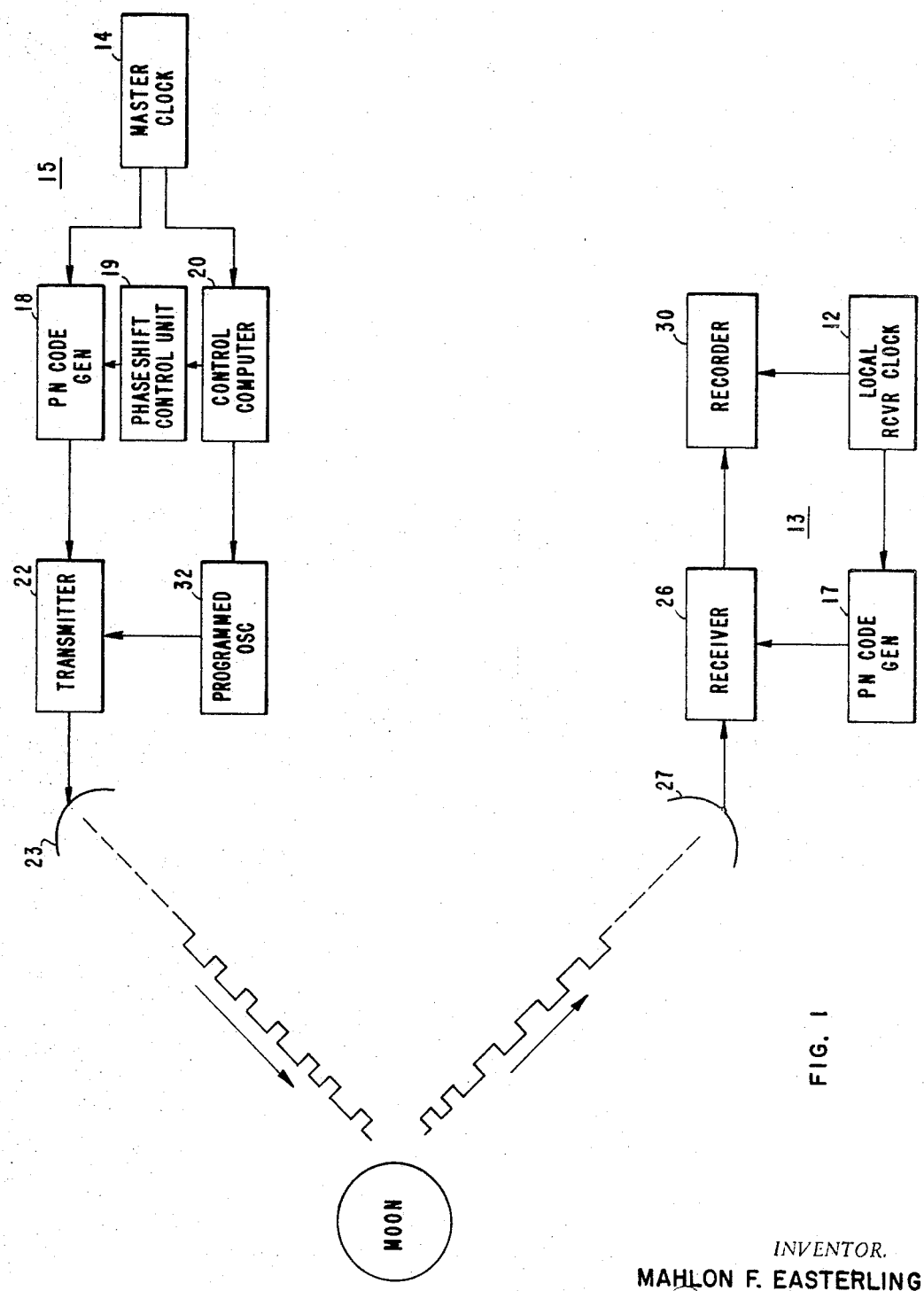
FIGURE 1 is a simple block diagram of the present invention.
Figure 3:
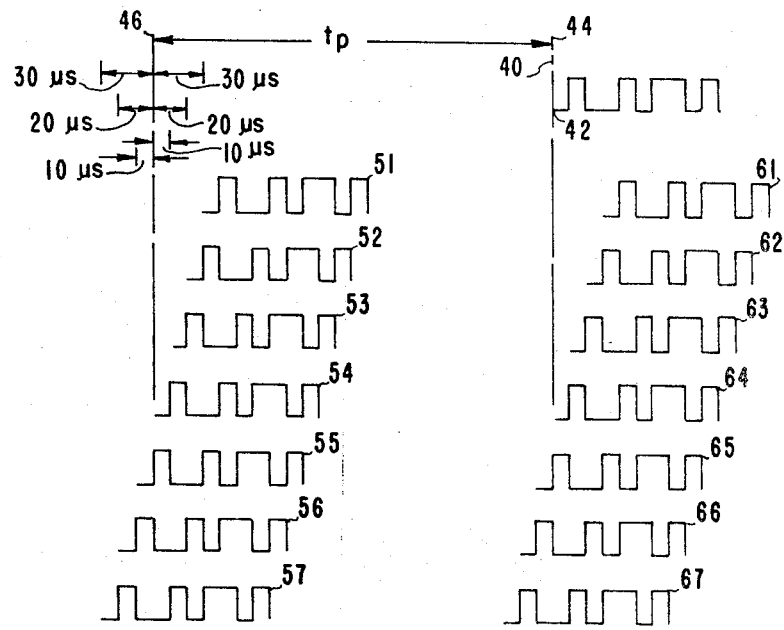
FIGURE 3 is a multiline diagram of waveforms of PN codes with respect to time.

The present invention may best be explained by referring to FIGURE 1, which is an oversimplified block diagram of the present invention, and to FIGURE 3, which is a multiline waveform diagram of portions of PN codes in different phase relationships. The basic objective of the invention is to synchronize a local receiver clock 12 (FIGURE 1) which is included in a receiver unit 13, remotely located from a transmitter unit 15, with a master clock 14 of the transmitter unit to within several microseconds, by reflecting a PN code from the moon. The system is based on the advantageous autocorrelation properties of a PN code.

Figure 2:
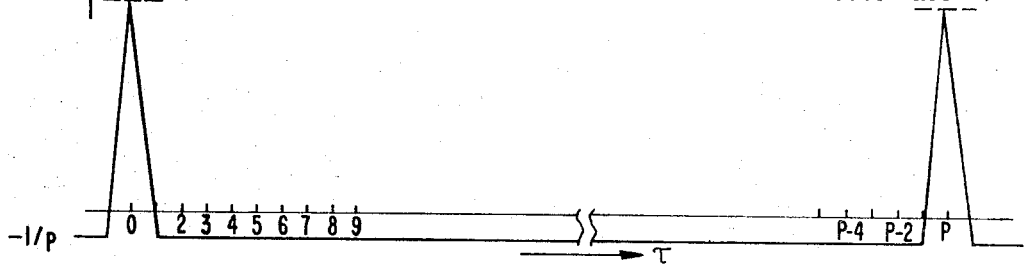
FIGURE 2 is a diagram of the autocorrelation function of a PN code.

A PN code can be defined as a binary waveform, derived from a pseudo-random (PN) sequence of binary digits, by assigning a constant time period, known as the digit period to each digit. The waveform takes on a unit positivet value when the digit is of one binary value, such as zero ("0") and a unit negative value when the digit is of the second binary value, such as one ("1"). Such a waveform is periodic and has an autocorrelation function as shown in FIGURE 2 to which reference is made herein.

In the system of the present invention, the PN code is used to provide a means for transmitting time for clock synchronization from one station to another, such as from transmitter unit 15 to the receiver unit 13. Also, the properties of the PN code are such that it is possible to retfletct he code from a diffuse target, such as the moon, yett be able to detect the signals which are reflected only from the front cap of the moon. Thus, the moon is used as if it were a much less diffused target. These aspects will be better appreciated from the following description.

In the time synchronization system of the present invention, the local receiver clock 12 is used to control the phase of a suitable PN code provided by a PN code generator 17 in the receiver unit 13. Basically, the generator 17 is reset at the beginning of each minute by a minute-defining signal from clock 12, so that at a specific instant during the minute, such as the start of the 30th second, the code output of the generator 17 is at a fixed selected phase.

In a transmitter unit 15, the master clock 14 is also used to time a PN code generator 18, which supplies an identical PN code. Time-defining signals such as minutes and seconds are also supplied by the master clock to a control computer 20. The PN code from generator 18 is transmitted to the moon by a transmitter 22 with an antenna 23. From the moon, the code is reflected to the receiver unit, shown including a receiver 26 and a receiver antenna 27. The receiver 26, which is of the heterodyne type and one which includes a power detector, as will be explained later in further detail, is also supplied with the PN code from generator 17. The output of the receiver, which is supplied to a recorder 30, represents the results of the corsscorrelation of the two PN codes, supplied thereto. Time-defining signals such as minutes and second marks, provided by clock 12 are also applied to the input recorder 30.

In transmitter unit 15 the control computer 20 advances the phase of the PN code generated by generator 18 ahead so that, after traversing the path to the moon and therefrom to receiver unit 13, the transmitted code arrives at the receiver 26 with the phase it would have if it were generated directly from the master clock and the master clock were located at station 13. Since, during any measuring interval, the range to the moon varies, the computer 20 is programmed to continuously shift the phase of the PN code to compensate for range changes. The actual phase shifting could be performed by a phase shift control unit 19, located between generator 18 and computer 20. The latter may supply the signals to unit 19 so that its output or outputs may be used to control the phase of the code from generator 18.

It should be appreciated to those familiar with logic circuit design that various arrangements may perform the functions to be described hereafter in detail. Computer 20 is also programmed to control an oscillator 32 which supplies the radio or carrier frequency to the transmitter. The oscillator is controlled to supply a changing frequency to the transmitter 22, in order to compensate for Doppler shifts of the transmitted signals, so that the carrier received by receiver 26 is essentially of a constant frequency.

In operation, the two PN codes supplied to the receiver 26 are crosscorrelated and the results plotted or recorded in recorder 30. If the clocks (12 and 14) are in time-synchronization, i.e., the minute-defining signals supplied by the two clocks occur in time-coincidence, the output of receiver 26 has a maximum value; if the two clocks are not synchronized, the crosscorrelation, and therefore the receiver's output, has less than a maximum value.

Generally, the two clocks are not perfectly synchronized. Consequently, it is necessary to shift the phase of one of the codes to search for maximum crosscorrelation. The amount of phase shift required to produce maximum crosscorrelation is a precise measure of the time by which the clocks differ, i.e., the error in their time-synchronization. This phase shift is also controlled by computer 20 in the transmitter unit 15.

If the moon were a point or concentrated target, then, as the transmitted PN code is phase-shifted with respect to the code provided by the generator 17, the value of the cross-correlation would first rise as the two codes are brought into phase, and then fall, as the phase shift increases and the two codes are out of phase. However, as is appreciated, the moon is a relatively large and diffuse target. Consequently for each transmitted PN code a number of code signals are reflected from the moon, each from a different portion or layer thereof.

In order to eliminate the undesired effect of multiple reflections on the time synchronization accuracy, the shifting of the phase of the transmitted PN code is controlled, to vary from a phase relationship in which the transmitted code arrives at the receiver late with respect to the code generated in the receiving unit, to a phase relationship in which the transmitted code arrives too early at the receiver. Such phase relationship variation is analogous to bringing the code generated in the receiver unit into phase first with the code reflected from the front cap of the moon, and thereafter, with code returns reflected from successively farther away moon layers. Such phase shift variations may also be regarded as analogous to varying the effective point from which reflective signals are received from a point which starts off in front of the moon and moves onto the moon through the front cap thereof. The usable indication is the rise in the receiver's output as the point moves onto the moon's front cap. At this point, only the returns from the moon's front cap are received. Therefore, the moon is made to appear as if it were a much less diffuse target.

In practice, when time-synchronization is to take place, the local receiver clock 12 provides generator 17 with a signal which defines the start of a specific minute in the day, as determined by clock 12. This signal, which is also supplied to the recorder 30 to produce a minute mark therein, is designated by numeral 40 in FIGURE 3, to which reference is made herein. In response to this minute-defining signal, the generator 17 is reset, to start providing the PN code at a specific phase, so that at the start of the 30th second it is at a known fixed phase, designated in FIGURE 3 by 42.

In the transmitter unit 15, the master clock 14 also provides a signal which similarly defines the start of the same minute in the day. This signal is designated in FIGURE 3 by numeral 44. In essence, it is the time synchronization between 40 and 44 that the present system is designed to measure. On the basis of time and lunar ephemeris inputs to the computer, the latter computes the time by which the transmitted code has to be advanced to compensate for the code transit time between the transmitter and receiver units, via the moon. In addition, it has to continuously vary such time advance for the continuously changing range between the earth and the moon. However, for this phase of the explanation, let it be assumed that the range is constant, and that the computed time by which the transmitted code has to be advanced is a constant $t_p$ μs., as shown in FIGURE 3. Therein line 46 represents a time signal produced $t_p$ μs. ahead of time signal 44.

In addition to computing $t_p$ and providing time signal 46, the computer 20 controls the code generator 18, so that at the beginning of the synchronization operation, the code is started 30 μs. late and is advanced 1 μs. per second during the 1-minute transmission period. That is, during the first second instead of transmitting the code $t_p$ μs. ahead of signal 44, it is transmitted only $t_p-30$ μs. ahead, while during the last second the code is transmitted $t_p+30$ μs. ahead of signal 44.

In FIGURE 3, waveforms 51, 52 and 53 represent PN codes transmitted 30 μs., 20 μs. and 10 μs. late, respectively. Waveform 54 represents a code transmitted at the correct time, and waveforms 55, 56 and 57 represent PN codes transmitted 10 μs., 20 μs. and 30 μs. early, respectively. Waveforms 61–67 which are related to waveforms 51–57, respectively, represent received PN codes in the proper time relationship with respect to minute signal 40, and in the proper phase relationship with respect to waveform 42, which represents the code generated in the receiver unit.

Assuming that the two clocks 12 and 14 are perfectly synchronized, i.e., the time signals 40 and 44 are produced in the two units in time coincidence, then from the foregoing it should be appreciated that all the codes transmitted late, i.e., less than $t_p$ μs. ahead of the time at which signal 40 is produced, would arrive late with respect to the receiver-generator code 42. Consequently, the output of the receiver would be at a minimum value or level. Only when a code is transmitted at the correct time, such as that designated 54, i.e., $t_p$ μs. ahead of the time of signal 40, will be two codes be in proper phase to produce a receiver output of a meaningful value.

Let $n$ represent the number of microseconds by which the transmitted code is advanced per second and let $x$ represent the number of seconds of the transmission period. Then, the transmitter code can be thought of as arriving at the receiver from $n \cdot x/2$ microseconds late to $n \cdot x/2$ microseconds early with respect to the receiver PN code.

If the moon were a sharp reflective target, then only when the code is transmitted at the correct time ($t_p$) will the receiver output be meaningful, decreasing in value as the code is transmitted earlier than required. However, since the moon is a diffuse target, the code is reflected from the front cap, as well as from other points further away from the earth. Consequently, as the code is transmitted earlier than required, although the code reflected from the front cap will arrive too early, codes reflected from further away points on the moon would arrive in the proper phase so that the receiver output would continue to produce a meaningful output.

Figure 4:
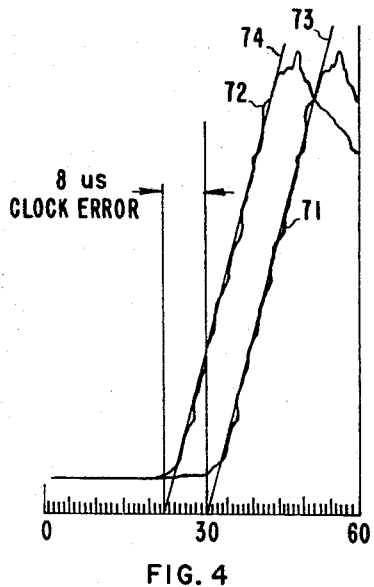
FIGURE 4 is a chart which represents the output of a recorder shown in FIGURE 1.

In a system actually reduced to practice in which a code 2047 digits long with a 10 μs. digit period is used, the changes in the receiver output, which is supplied to the recorder 30, result in a plot or graph as shown in FIGURE 4, to which reference is made herein. FIGURE 4 is actually a strip chart produced by recorder 30. The chart abscissa is used to define a timing track, containing 1-minute and 1-second marks plotted in response to timing signals from clock 12. In FIGURE 4, the curve 71 represents the amplitude of the receiver output for a particularly calibrated system. Only when the two clocks are perfectly synchronized is curve 71 produced. Curve 72 is produced when the synchronized error is 8 μs.

To determine the synchronization error, a straight line is drawn along the rise of the curve to its intersection with the base line, and the number of 1-second marks from the center or the 30th second mark is counted. For curve 71 the straight line 73 intersects the base line at the 30th second mark. Thus, it indicates zero synchronization error. However, line 74, drawn along the rise of curve 72 intersects the base line at the 22nd-second mark, thereby indicating a synchronization error of 8 μs. (30–22). Clock 14 precedes clock 12 since the curve starts to rise ahead of the 30th second mark. If the intersection were to occur at the 38th second mark, it also would have indicated an error of 2 μs., but one in which the time marks of clock 12 preceded those of clock 14.

The system heretofore described may thus be summarized as one in which a PN code, whose phase is controlled by time-defining signals from a master clock, is transmitted via the moon to a receiver unit. The receiver unit includes a local clock which also provides time-defining signals. These are used to control the phase of a locally-generated PN code.

At the beginning of the measurement period, such as the start of a specific minute, the locally-generated code is set to a specific phase. In the transmitter unit, prior to that minute, the phase of the code to be transmitted is controlled so that it is started 30 μs. late with respect to the phase of the code in the receiver unit. The phase of the transmitted code is advanced by 1 microsecond per second during the 1-minute measurement period, until on the 60th second, it arrives 30 μs. early, with respect to a correct time, determined by the transit time of the code to the receiver unit via the moon.

By plotting the output of the receiver over the 1-minute period, the synchronization error between the master and local clocks is easily determined. It should be pointed out that it is only necessary to measure the receiver output to one second to obtain 1 μs. resolution of the clock synchronization error. The digit period is selected to be sufficiently long to obtain maximum reflection from the moon, yet short enough to achieve desired correlation accuracy. A code-digit period of 10 μs. has been found to meet both conditions.

In practice, the code is transmitted in the form of a biphase modulated carrier frequency. Phase modulation takes place in the transmitter 22, which is supplied with the code to be transmitted and the carrier frequency provided by oscillator 32. Similarly, in the receiver 26 of unit 13, the code provided by generator 17 is used to biphase modulate a local fixed frequency. The carrier and local frequencies are mixed in the receiver in a manner, well known to those familiar with heterodyne type receivers, to determine the phase relationship between the transmitted and the locally generated codes. Since the local frequency of the receiver is fixed, the carrier frequency is made to vary to compensate for Doppler shifts so that the carrier frequency, which is received at the receiver 26, is also fixed.

As previously indicated, carrier frequency changes are achieved by computing in computer 20 the doppler shifts and using such computations to control the frequency, supplied by oscillator 32. Thus, computer 20 is seen to perform three functions. One of the functions is to determine the time $t_p$ (FIGURE 3); the second is to advance the phase of the PN code by 1 μs. late to 30 μs. early; and the third function is to control the carrier frequency so that, after it is affected by the Doppler shift, it arrives at a fixed value at the receiver unit.

Reference is now made to FIGURE 5 which is a complete block diagram of the system of the present invention in which one receiving unit is shown. In FIGURE 5, elements similar to those shown in FIGURE 1 are designated by like numerals. In transmitter unit 15, a master frequency standard 81 is shown. Its function is to supply signals to control the operation of the master clock, as well as to supply signals to generator 18 to generate the desired code. In the presently described example, since the period of each code digit is 10 μs., the frequency standard 81 supplies generator 18 with signals at a frequency of 100 kc. A block 85 represents the sources of computer input data, necessary for the aforementioned computations. It should be appreciated that computers of various types and sizes, which are presently available, can be programmed to perform the necessary functions. Therefore, disclosing the computer in block form is believed to be sufficient.

The transmitter 22 is shown comprising a phase modulator 86 which modulates the frequency from oscillator 32 with the PN code from generator 18. The modulated signals or frequency is then frequency multiplied in a multiplier 87, and power amplified in 88, before being transmitted to the moon through antenna 23. The technique of phase modulating carrier signals at a lower frequency than the final desired carrier frequency is well known in the art of radio communication. In one specific embodiment, the carrier frequency was continuously controlled to be 8450.1 mc. at the receiving antenna 27. The modulator 86 actually modulated the signals to a phase angle of only ±1.5°. However, when these signals were multiplied by a factor of 60 in frequency multiplier 87, full ±90°, i.e., biphase modulation, was achieved.

Like the transmitter unit 15, the receiver unit 13 includes a receiver frequency standard 91, which supplies controlling signals to receiver clock 12, signals at 100 kc. to generator 17, and signals at a selected frequency to a frequency synthesizer 93. In the particular example described herein, wherein the carrier frequency received at 27 is 8450.1 mc., synthesizer 93 is supplied with signals at 5 mc. These are multiplied in synthesizer 93 to 150 mc.

and supplied to a phase modulator 94. Synthesizer 93 also multiplies the input signals at 5 mc. to supply signals at 50 mc. to a mixer 95. The values of these frequencies are shown in FIGURE 5.

In modulator 94, the code generated in PN code generator 17 is used to modulate the 150 mc. signals from synthesizer 93. The frequency of the modulated signals is multiplied in multiplier 96. the output signals of multiplier 96, which are supplied to a mixer 97, are biphase modulated signals at a frequency of 8400 mc. The carrier frequency of 8450.1 mc. received at antenna 27 is supplied via a preamplifier 98 to the mixer 97 whose output is at a frequency of about 50.1 mc. It is amplified in an I.F. amplifier 101, which has a bandwidth of about 40 kc. Thereafter, the amplified signals at 50.1 mc. are mixed in mixer 95, with a 50 mc. signal derived from synthesizer 93 to produce output signals at 100 kc. The 100 kc. signals are amplified in a 100 kc. bandpass amplifier 102 with a very narrow bandwidth of 10 c.p.s.

The output of amplifier 102 is supplied to a power detector 103 which is followed by a low pass filter 104. The latter has a time constant of about 10 seconds. It is the output of the filter 104 which is supplied to the recorder 30. The filter 104, ahead of the recorder 30, effectively removes all receiver noise as indicated by the smooth straight portions of curves 71 and 72 before the arrival of codes, reflected from the moon. The roughness of the curves after this point is caused by multiple-path lunar reflections of such magnitude that the filter does not entirely remove them. The time constant of the filter 104 is selected as a function of transmitter power, receiver operating temperature, and other operating parameters in order to reduce the recording of system noise on the strip chart.

From the foregoing, it is seen that all the required adjustments of the code phase and carrier frequency are performed in the transmitter unit 15 (FIGURE 1). The receiver unit is a relatively simple, heterodyne type receiver. Consequently, the single transmitter unit could be used to synchronize clocks in many remote receiving stations. Thus, unit 13 in FIGURE 1 should be assumed to represent any one of a plurality of receiver units. Signals can be sent to only one receiving unit at a time, because the computer 20 in transmitter unit 15 must adjust the carrier frequency to remove the Doppler shifts, and must advance the code timing to compensate for signal-transit time, factors which vary from one receiver unit to another, as well as during the measurement at any given station. Furthermore, such signals could only be sent when the moon is in view at both the transmitter and receiver units. For this reason, it is important to carefully select the locations of the transmitter unit and those of the various remotely located receiver units.

It has been calculated that the common view period between a transmitter unit located at Goldstone, Calif., and any one of receiver units located at Cape Kennedy in Florida, Canberra and Woomera in Australia, Ascension Island in the South Atlantic, Johannesburg in South Africa, and Madrid in Spain, would vary from less than 10 minutes to several hours per day. This common view period varies over a monthly and a 19-year cycle with a minimum of the 19-year cycle for the least favorable path occurring during 1967. Even when the least favorable path occurs, sufficient time would be available for daily calibration or synchronization of each of the clocks in the receiver unit with the master clock at Goldstone.

As previously indicated, each receiver unit is designed to require a minimum of operator attention. This is achieved by incorporating all frequency and code phase adjustments to be performed in the transmitter unit. At each receiver unit, the antenna 27 has to be controlled to follow the moon motion. This may be achieved by a relatively simple antenna drive unit 110 (FIGURE 5) which has hour angle and tracking declination setting means and is capable of being driven at a necessary traveling rate to track the moon and is set at the start of a pass. Thereafter, no further operator attention is required. The drive is preferably by synchronous motor with a rate correction inserted through a differential gear and a variable speed motor. By a simple change in a mounting base wedge angle the same antenna and drive unit could be used at any latitude.

The positioning of the antenna 23 of the transmitter unit 15 may not be as straightforward. In the particular embodiment described herein a relatively large transmitting antenna with a narrow beam is employed. For satisfactory operation, it is necessary that the antenna center always point to the center of the moon as seen from the transmitter. This can be accomplished by controlling the antenna position with a servo unit 115, which is controlled by signals from the computer 20. The latter could be programmed to utilize its time and ephemeris inputs to provide unit 115 with appropriate control signals to direct the antenna 23 towards the moon so that the transmitted code is reflected to any selected receiver unit. Feedback signals are preferably supplied to the computer 20 from the servo unit 115 from an angle readout 120, for precise antenna positioning.

As previously described, the transmitter code is started 30 μs. late and is advanced at the rate of 1 μs. per second to cover a range of 60 μs. during a 1-minute transmission period. Thus, it is apparent that a receiver locals clock, with an error in excess of ±30 μs. would not provide a response to such a transmission. To determine the error in such a situation, the code advance rate in the transmitter unit can be advanced to 10 or 100 microseconds per second by a computer command. This would provide a search range of 600 to 6,000 microseconds. Thus, after three transmission periods, it is possible to locate the timing of the receiver clock in a band of 6 milliseconds. Thereafter, the code advance in the transmitter unit can return to the slower rate of 1 μs. per second for precise time synchronization.

It should be appreciated that the accuracy with which two clocks could be synchronized, in accordance with the teachings disclosed herein, depends on various sources of error and the ability to estimate or determine their error contribution. The possible sources of error include the following:

(1) Lunar ephemeris error;
(2) Range error due to rough surface and variation from a true sphere of the moon;
(3) Variation in delay time within the transmitter;
(4) Station location error;
(5) Error in curve interpretation due to roughness caused by lunar multiple path reflections;
(6) Code jitter;
(7) System noise.

The lunar ephemeris is generally known to 150 meters which produces a time error of 1 μs. In practice, no measurable variations in delay time in the transmitter have been noted, but their effect would be the same as the lunar ephemeris, i.e., 1 μs. A station location error will appear as a continuous bias error which could be removed. The roughness of the curve caused by lunar multiple path and/or reflectivity changes varies with the sub-earth point. This can cause ambiguities of 2 to 3 μs. The minimum code step at the transmitter is 1 μs which causes a staircase fit to the range variation. However, this effect has not been noticeable in the charted data. System noise does not produce significant error due to the post detection lowpass filter 104 with the 10-second time constant.

The time error contributed by some of the sources could be canceled by installing a receiving unit a few miles from the transmitting unit and by operating its code generator from the transmitter clock via a microwave link to produce zero clock error; and if any error is indicated, it is removable by correction inputs to the computer 20. Such a technique would cancel time errors due to possible variations in delay time within the transmitter, lunar ephemeris error and range error due to rough surface and variation from a true sphere of the moon. The time error which could not be canceled is less than 5 μs., generally between 2 and 3 μs. Thus, the present invention is capable of synchronizing remotely located clocks to within a few microseconds.

There has accordingly been shown and described herein a novel time synchronization system for synchronizing a master clock with any one of a plurality of local clocks, by means of moon-reflected coded signals.

What is claimed is:

1. A system for time-synchronizing a receiver clock of the type providing minute and second signals, said clock being in a remotely located receiving system, with a master clock in a transmitting system, said master clock being of the type producing similar minute and second signals, the system comprising:

a transmitter unit in said transmitting station adapted to transmit signals to the moon; and
a receiver unit in said receiving station, said receiver unit including a heterodyne-type receiver consisting of a source of local signals at a selected frequency, a receiver PN code generator for providing a local PN code of a predetermined length and digit period, means for phase modulating the local signals with said local PN code, and means applying the minute signals provided by said receiver clock to said receiver PN code generator to reset the code at a selected phase at the start of each minute, and means for receiving said signals reflected from the moon; said transmitter unit including a source of carrier signals, a transmitter PN code generator for providing a transmitter PN code identical with said local PN code in length and digit period, means for modulating said carrier signals with the transmitter PN code, means for directing the modulated carrier signals to the moon for reflection to said receiver unit; and
control means responsive to the minute and second signals from said master clock for controlling the phase of the transmitter PN code over a selected transmission period so as to compensate for the carrier signals transit time to said receiver unit via the moon, and to vary at a predetermined rate the phase of the transmitter PN code with respect to the receiver PN code phase from a value representing a late arrival to one representing an early arrival, said receiver unit further including means for recording, during said transmission period, signals representing the crosscorrelation of the receiver PN code and the transmitter PN code received therein.

2. The system as recited in claim 1 wherein said heterodyne-type receiver includes means for detecting the power of the crosscorrelated PN codes and said recording means recording said signals and minute and second marks produced in response to said minute and second signals, respectively, from said local clock.

3. The system as recited in claim 1 wherein said control means in said transmitting unit shift said transmitter PN code so as to vary its phase by $n$ microseconds during each of $x$ seconds of said transmission period whereby said transmitter code arrives at said receiver from $n \cdot x/2$ microseconds late to $n \cdot x/2$ microseconds early, with respect to said receiver PN code.

4. The system as recited in claim 3 wherein $n=1$ and $x=60$, and means connecting said control means to said source of carrier signals for modifying the frequency thereof to compensate for Doppler effect so that the frequency of the carrier signals which arrive at said receiver is substantially constant.

5. The system as recited in claim 4 wherein said heterodyne-type receiver includes means for detecting the power of the cross-correlated PN codes and said recording means record signals representing the detected power and minute and second marks produced in response to minute and second signals respectively, from said local clock.

6. A system for synchronizing a receiver clock which provides time-defining signals in a remotely located receiving station with a master clock which provides time-defining signals in a transmitting station, the system comprising:
   first and second code generators in said transmitting and receiving stations respectively, said generators providing preselected identical codes;
   transmitter means in said transmitting station to transmit the code from said first generator to a diffuse target for reflection to said receiver station;
   receiver means in said receiving station for receiving the transmitted code, reflected thereto from the moon, and for relating it with the code generated in in said second code generator therein;
   means in said receiving station for controlling the phase of the code from said second generator with the time-defining signals from said local clock; and
   control means in said transmitting station for variably controlling the phase of the code from said first generator as a function of the time-defining signals from said master clock, said latter means controlling the phase over a selected period, during which the transmitted code which is received at said receiving station varies from a selected late arrival to a selected early arrival of said transmitted code signals with respect to the phase of the code generated in said receiving station.

7. The system as recited in claim 6 wherein said code is a PN code of selected length and digit period, and wherein said control means in said transmitting station advances the phase of the transmitted code to compensate for the code transit time from the transmitting to the receiving station, via the diffuse target, so that during a first part of said period the received code arrives decreasingly late with respect to the code generated in said receiving station and during a second part of said period the received code arrives increasingly early with respect to the code generated in said receiving station.

8. The system as recited in claim 7 wherein said control means vary the phase of the transmitted code by $n$ microseconds per second, and the selected period is $x$ seconds long.

9. The system as recited in claim 8 wherein the diffuse target is the moon and $n$ is not less than one microsecond, and the digit period is in the range of 10 microseconds.

10. The system as recited in claim 9 wherein the phase of the transmitted PN code is controlled over a selected period of one minute to vary from 30 microseconds late to 30 microseconds early with respect to the code generated in the receiver unit, the phase variation being at 1 microsecond per second.

11. A system for time synchronizing a local clock which provides time-defining signals in a receiver unit with a master clock which provides time-defining signals in a transmitter unit, the system comprising:
   a receiver unit; and
   a transmitter unit including a master clock which provides time-defining signals, a transmitter PN code generator for providing a PN code of predetermined length and digit period, transmitting means for transmitting said PN code to the moon for reflection therefrom to said receiver unit;
   said receiver unit including a local clock providing time-defining signals, a receiver PN code generator for providing a PN code equal in length and with the same digit period as the PN code provided by said transmitter PN code generator, means for controlling said receiver PN code generator with a selected time-defining signal from said local clock to start the generation of the code therein, receiver means for receiving the PN code reflected from the moon thereto, and means for correlating the received PN code with the PN code generated by said receiver PN code generator to provide an output signal representative of the crosscorrelation of the two codes;
   said transmitting means further including means for controlling the transmitter code generator during a period of time, defined by the time-defining signals from said master clock, so that the phase of the PN code received by said receiving means varies from a relationship in which the received code is ahead in time with respect to the code generated by said receiver PN code generator to a value, in which the received code is behind in time with respect to the code generated by said receiver PN code generator; and
   means in said receiver unit utilizing said output signal and the time-defining signals, provided by the local clock in said receiver unit, to display the time relationship therebetween.

References Cited

UNITED STATES PATENTS

| | | | |
|---|---|---|---|
| 2,671,131 | 3/1954 | Johnson | 58—24 |
| 3,128,465 | 4/1965 | Brilliant | 58—24 |

RICHARD B. WILKINSON, Primary Examiner

E. C. SIMMONS, Assistant Examiner

U.S. Cl. X.R.

58—152